US012332260B2

(12) United States Patent
Iwase et al.

(10) Patent No.: US 12,332,260 B2
(45) Date of Patent: Jun. 17, 2025

(54) AUTOMATIC ANALYZER

(71) Applicant: Hitachi High-Tech Corporation, Tokyo (JP)

(72) Inventors: Yuichi Iwase, Tokyo (JP); Kohei Nonaka, Tokyo (JP); Tetsuji Kawahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1103 days.

(21) Appl. No.: 17/276,941

(22) PCT Filed: Oct. 18, 2019

(86) PCT No.: PCT/JP2019/041028
§ 371 (c)(1),
(2) Date: Mar. 17, 2021

(87) PCT Pub. No.: WO2020/090508
PCT Pub. Date: May 7, 2020

(65) Prior Publication Data
US 2022/0034918 A1 Feb. 3, 2022

(30) Foreign Application Priority Data

Oct. 31, 2018 (JP) .................................. 2018-204879

(51) Int. Cl.
*G01N 35/00* (2006.01)
*G01N 35/10* (2006.01)

(52) U.S. Cl.
CPC ..... *G01N 35/0092* (2013.01); *G01N 35/1004* (2013.01); *G01N 35/1009* (2013.01)

(58) Field of Classification Search
CPC ........... G01N 35/1004; G01N 35/0092; G01N 35/1016; G01N 35/1009;
(Continued)

(56) References Cited

U.S. PATENT DOCUMENTS 8,926,903 B2 * 1/2015 Nogami ................. G01N 1/405
422/65
11,262,372 B2 * 3/2022 Shibuya ........... G01N 35/00871
(Continued)

FOREIGN PATENT DOCUMENTS

JP 08-278252 A 10/1996
JP 2005-003610 A 1/2005
(Continued)

OTHER PUBLICATIONS

Extended European Search Report received in corresponding European Application No. 19879080.0 dated Jul. 6, 2022.
(Continued)

*Primary Examiner* — Shogo Sasaki
(74) *Attorney, Agent, or Firm* — MATTINGLY & MALUR, PC

(57) ABSTRACT

The fluid temperature within piping of a sample dispensing system is stabilized in order to maintain stable dispensing performance with high precision in an automatic analyzer. A controller executes a first operation sequence to operate the sample dispensing system in a standby state continued until the sample is transported to the sample dispensing position, and executes a second operation sequence to operate the sample dispensing system in an analysis state in which the sample located in the sample dispensing position is dispensed. A time period during interior cleaning performed on the sample probe in a single cycle of the first operation sequence is set to be shorter than a time period during interior cleaning performed on the sample probe in a single cycle of the second operation sequence. Alternatively, the first operation sequence is configured to perform interior cleaning at a rate of once every multiple of cycles.

7 Claims, 13 Drawing Sheets

(58) Field of Classification Search
CPC . G01N 2035/00425; G01N 2035/1006; G01N 35/0095; G01N 2035/00356; G01N 2035/0094

See application file for complete search history.

(56) References Cited

U.S. PATENT DOCUMENTS

| | | | | |
|---|---|---|---|---|
| 11,486,890 | B2* | 11/2022 | Imai | G01N 35/1004 |
| 11,506,675 | B2* | 11/2022 | Masuya | G01N 21/51 |
| 11,519,924 | B2* | 12/2022 | Ebihara | G01N 35/00 |
| 11,555,824 | B2* | 1/2023 | Hashimoto | G01N 35/1002 |
| 11,565,266 | B2* | 1/2023 | Watanabe | G01N 35/0092 |
| 11,639,943 | B2* | 5/2023 | Imai | G01N 35/1002 422/65 |
| 2003/0040117 | A1* | 2/2003 | Devlin, Sr. | G01N 35/0092 436/46 |
| 2004/0185549 | A1* | 9/2004 | Fujita | G01N 35/025 435/287.2 |
| 2009/0000401 | A1 | 1/2009 | Oonuma | |
| 2010/0108101 | A1 | 5/2010 | Shibata et al. | |
| 2010/0254857 | A1* | 10/2010 | Mazume | G01N 35/04 134/113 |
| 2011/0000763 | A1 | 1/2011 | Kimura et al. | |
| 2019/0041415 | A1 | 2/2019 | Nonaka et al. | |
| 2019/0212351 | A1 | 7/2019 | Konishi et al. | |
| 2020/0096529 | A1 | 3/2020 | Chida et al. | |
| 2020/0386779 | A1 | 12/2020 | Inaba et al. | |
| 2024/0100535 | A1* | 3/2024 | Barenthin | B01L 3/021 |
| 2024/0230700 | A1* | 7/2024 | Nojima | G01N 35/1067 |

FOREIGN PATENT DOCUMENTS

| | | |
|---|---|---|
| JP | 2009-229232 A | 10/2009 |
| JP | 2010-107398 A | 5/2010 |
| JP | 2012-150023 A | 8/2012 |
| JP | 2013-217740 A | 10/2013 |
| WO | 2017/141626 A1 | 8/2017 |
| WO | 2017/163613 A1 | 9/2017 |
| WO | 2018/047545 A1 | 3/2018 |
| WO | 2018/173636 A1 | 9/2018 |

OTHER PUBLICATIONS

International Search Report of PCT/JP2019/041028 dated Dec. 10, 2019.

* cited by examiner

TEMPERATURE CHANGE DUE TO DIFFERENCE
IN INTERIOR CLEANING FREQUENCY
IN STANDBY STATE

A : TEMPERATURE OF SURROUNDING ENVIRONMENT
B : ANALYSIS-STATE EQUILIBRIUM TEMPERATURE
C : STANDBY-STATE EQUILIBRIUM TEMPERATURE
    (INTERIOR CLEANING ONCE EVERY TWO CYCLES)
D : STANDBY-STATE EQUILIBRIUM TEMPERATURE
    (INTERIOR CLEANING ONCE EACH CYCLE)

FIG. 11

EQUILIBRIUM TEMPERATURE IN EACH INTERIOR CLEANING FREQUENCY IN STANDBY STATE

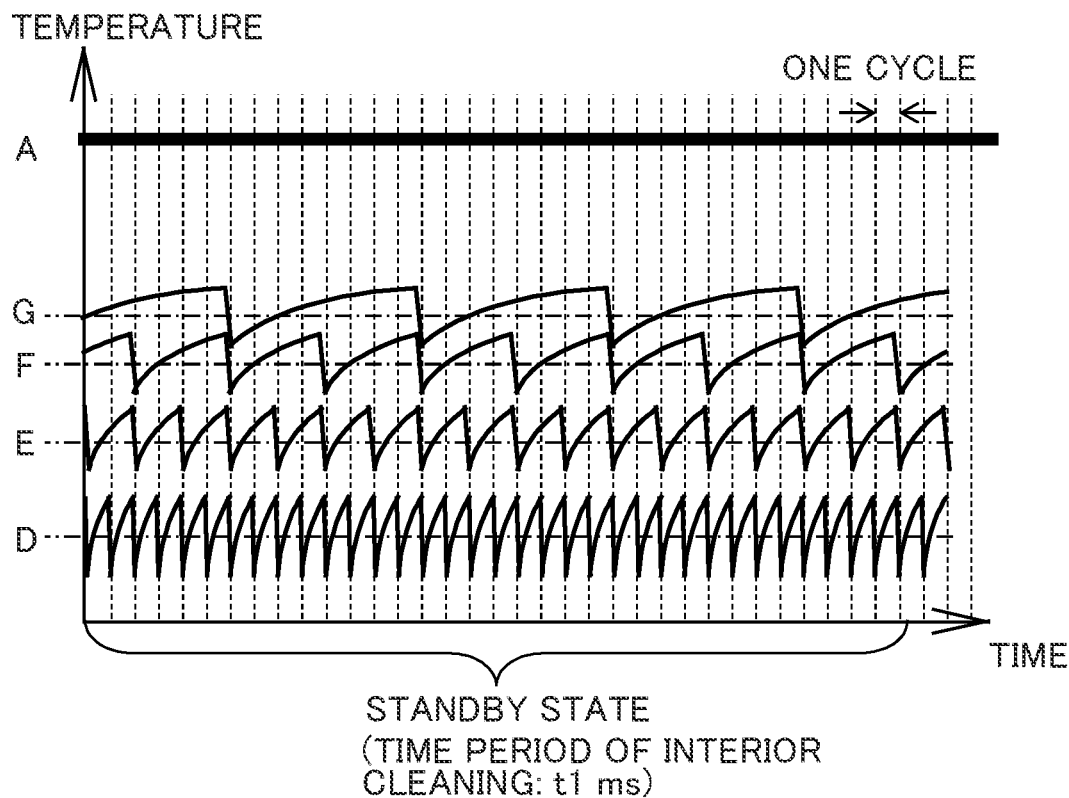

A : TEMPERATURE OF SURROUNDING ENVIRONMENT
G : STANDBY-STATE EQUILIBRIUM TEMPERATURE
    (INTERIOR CLEANING ONCE EVERY 8 CYCLES)
F : STANDBY-STATE EQUILIBRIUM TEMPERATURE
    (INTERIOR CLEANING ONCE EVERY 4 CYCLES)
E : STANDBY-STATE EQUILIBRIUM TEMPERATURE
    (INTERIOR CLEANING ONCE EVERY 2 CYCLES)
D : STANDBY-STATE EQUILIBRIUM TEMPERATURE
    (INTERIOR CLEANING ONCE EACH CYCLE)

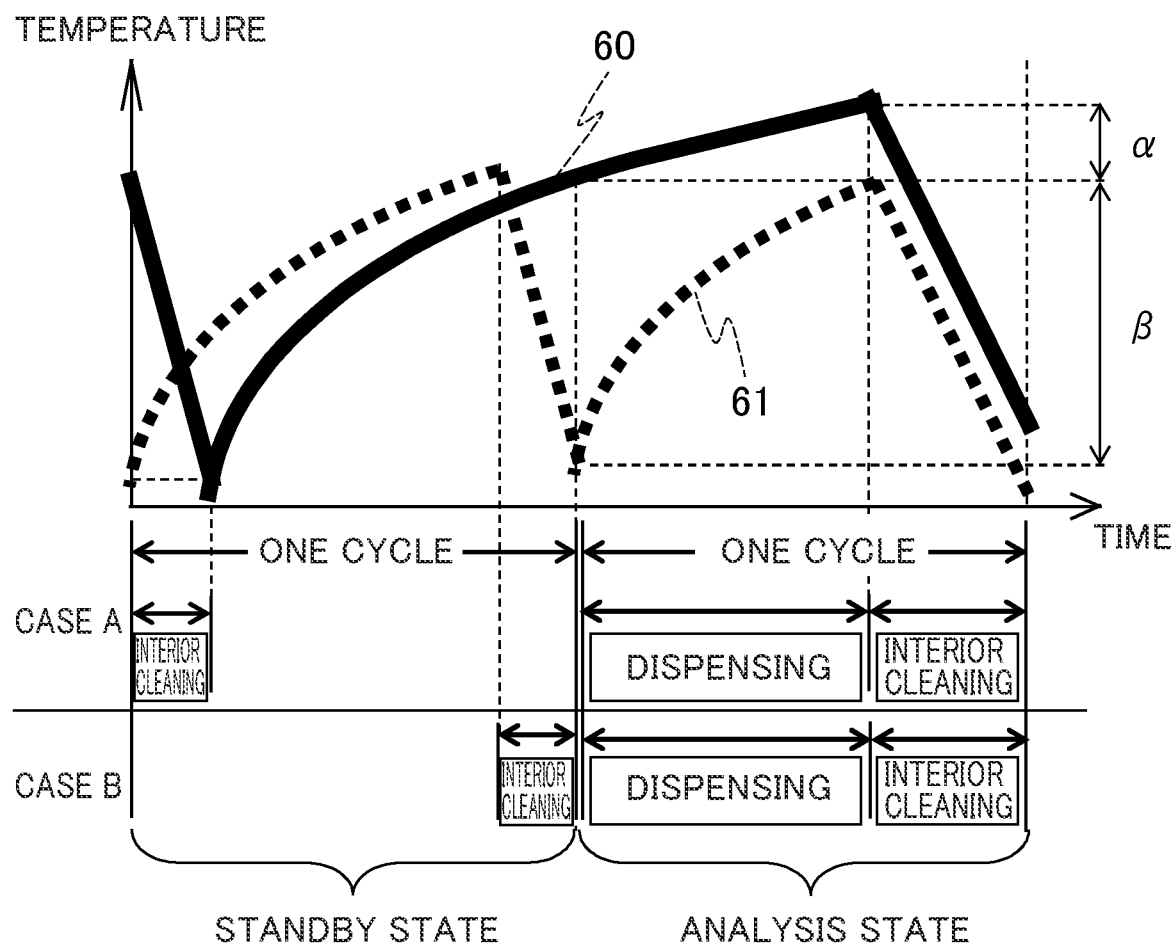

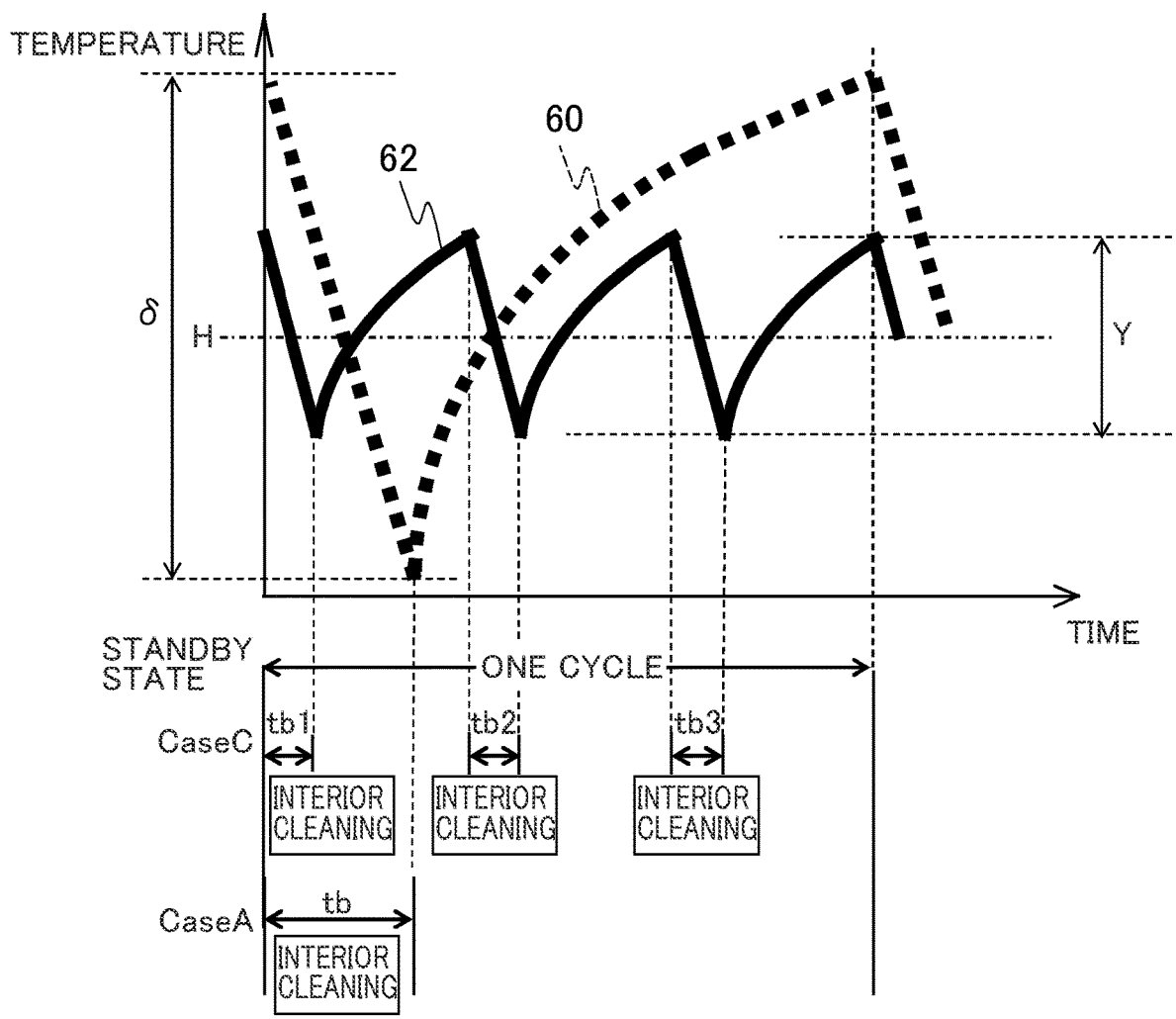

AUTOMATIC ANALYZER

TECHNICAL FIELD

The present invention relates to an automatic analyzer including a sample dispensing system.

BACKGROUND ART

In an automatic analyzer for laboratory testing, a sample under test used in analysis (hereinafter referred to as a "sample") is transported to a sample dispensing position by a sample transport mechanism, then aspirated by use of a sample dispensing system included in the apparatus, and then ejected into an analysis section for sample analysis.

In the sample dispensing system, after dispensing of a sample, if a different sample is aspirated, interior cleaning (hereinafter sometimes referred to as "interior cleaning") is performed on a sample probe in order to prevent contamination between samples. For the interior cleaning, a high-pressure pump, which is connected to piping of the sample dispensing system, is used to inject ion-exchange water into piping and drain it. By performing the interior cleaning on a sample probe in this manner, the in-pipe fluid is partially or totally replaced. This makes fluid temperature within piping unstable. Specifically, if there is a temperature difference between the temperature of injected fluid (ion-exchange water) and environment temperature around the sample dispensing system, a certain time period is required until the fluid temperature within piping becomes stable.

Stable fluid temperature within piping of the sample dispensing system is important for to an increase in sample dispensing performance. The volume of in-pipe fluid has a dependence on fluid temperature, and as the temperature rises, the volume expands, whereas as the temperature drops, the volume contracts. If the fluid temperature varies during sample dispensing operation, a change in volume occurs in the in-pipe fluid, resulting in the dispensing performance being adversely influenced. In particular, if the sample ejection rate is low, the influence cannot be neglected. For mitigating the adverse influence of changes in temperature, Patent Literature 1 discloses techniques to restrict the sample dispensing operation during a time from the completion of the operation of cleaning the interior of a sample probe until the fluid temperature within piping becomes stable.

CITATION LIST

Patent Literature

Patent Literature 1: Japanese Patent Application Laid-Open No. 2012-150023

SUMMARY OF INVENTION

Technical Problem

In the techniques disclosed in Patent Literature 1, due to the restriction of the sample dispensing operation during the time during which the fluid temperature is unstable, the analysis operation may be stagnated to lead to a reduction in throughput of the automatic analyzer.

It is an object of the present invention to provide an automatic analyzer capable of stabilizing fluid temperature within piping of a sample dispensing system in order to maintain stable dispensing performance with high precision without restriction on sample dispensing operation based on a situation of an analysis request to the automatic analyzer, setting of an analyte ejection rate and/or the like.

Solution to Problem

An automatic analyzer includes: a sample dispensing system that uses a sample probe to dispense a sample located in a sample dispensing position; and an apparatus controller that controls the sample dispensing system. The apparatus controller executes a first operation sequence to operate the sample dispensing system in a standby state continued until the sample is transported to the sample dispensing position, and the apparatus controller executes a second operation sequence to operate the sample dispensing system in an analysis state in which the sample located in the sample dispensing position is dispensed. A time period during interior cleaning performed on the sample probe in a single cycle of the first operation sequence is set to be shorter than a time period during interior cleaning performed on the sample probe in a single cycle of the second operation sequence. Also, the first operation sequence is configured to perform the interior cleaning of the sample probe at a rate of once every multiple cycles.

Advantageous Effects of Invention

According to the present invention, an equilibrium temperature of in-pipe fluid in a standby state is controlled to be closer to an equilibrium temperature of in-pipe fluid in an analysis state. Thereby, the amount of change in fluid temperature during the sample dispensing operation can be decreased to maintain stable dispensing performance with high precision.

These and other challenges and new features will be apparent from a reading of the following detailed description and a review of the accompanying drawings.

BRIEF DESCRIPTION OF DRAWINGS

FIG. 11 is a graphical representation showing equilibrium temperature according to each interior cleaning frequency in the standby state.

FIG. 12 is a graphical representation showing timing for the interior cleaning operation in the standby state, and the amount of change in temperature during the dispensing operation.

FIG. 13 is a graphical representation showing timing for the interior cleaning operation and the amount of change in temperature when the interior cleaning operation in the standby state is performed more than once in one cycle.

DESCRIPTION OF EMBODIMENTS

Embodiments according to the present invention will now be described with reference to the accompanying drawings. It should be understood that examples described below represent one of embodiments of the present invention and the present invention is not limited to the embodiment.

Figure 1:
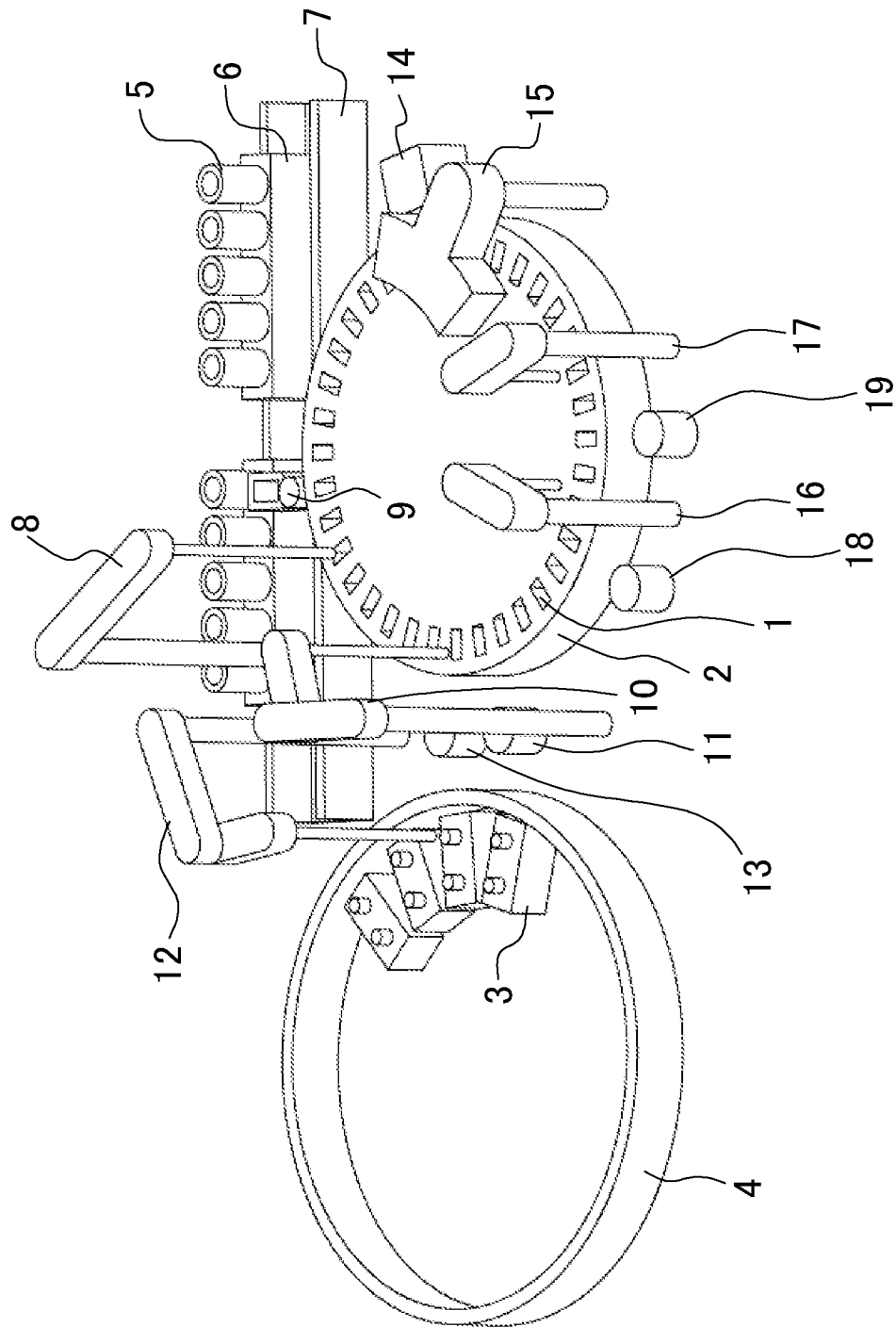
FIG. 1 is a schematic configuration diagram of an automatic analyzer.

FIG. 1 illustrates a schematic configuration diagram of an automatic analyzer. The automatic analyzer includes: a reaction disk 2 with circularly arranged reaction containers 1 in which a reaction occurs between a sample and a reagent; a reagent cool box 4 in which reagent bottles 3 storing various reagents are installed; sample cups 5 accommodating samples; a sample rack 6 holding the sample cups 5; and a sample transport mechanism 7 to transport the sample rack 6 to a sample dispensing position. A sample is aspirated by a sample dispensing mechanism 8, and then dispensed into the reaction containers 1 on the reaction disk 2. After the dispensing by the sample dispensing mechanism, a sample probe is cleaned in a sample probe cleaning bath 9.

A reagent is aspirated from the reagent bottle 3 by a first reagent dispensing mechanism 10 or a second reagent dispensing mechanism 12, which is then dispensed into each of the reaction containers 1 in which the sample has already been dispensed. A liquid mixture of the sample of the reagent is agitated by agitation mechanisms 16, 17. An absorbency of reaction liquid in the reaction container 1 is measured by a spectrophotometer 14 which is disposed around the reaction disk. Further, based on the measured data, an apparatus controller 26 (see FIG. 2) calculates and reports a test result to an operator. The reaction container 1 after the completion of analysis is cleaned for reuse by a reaction container cleaning mechanism 15.

Figure 2:
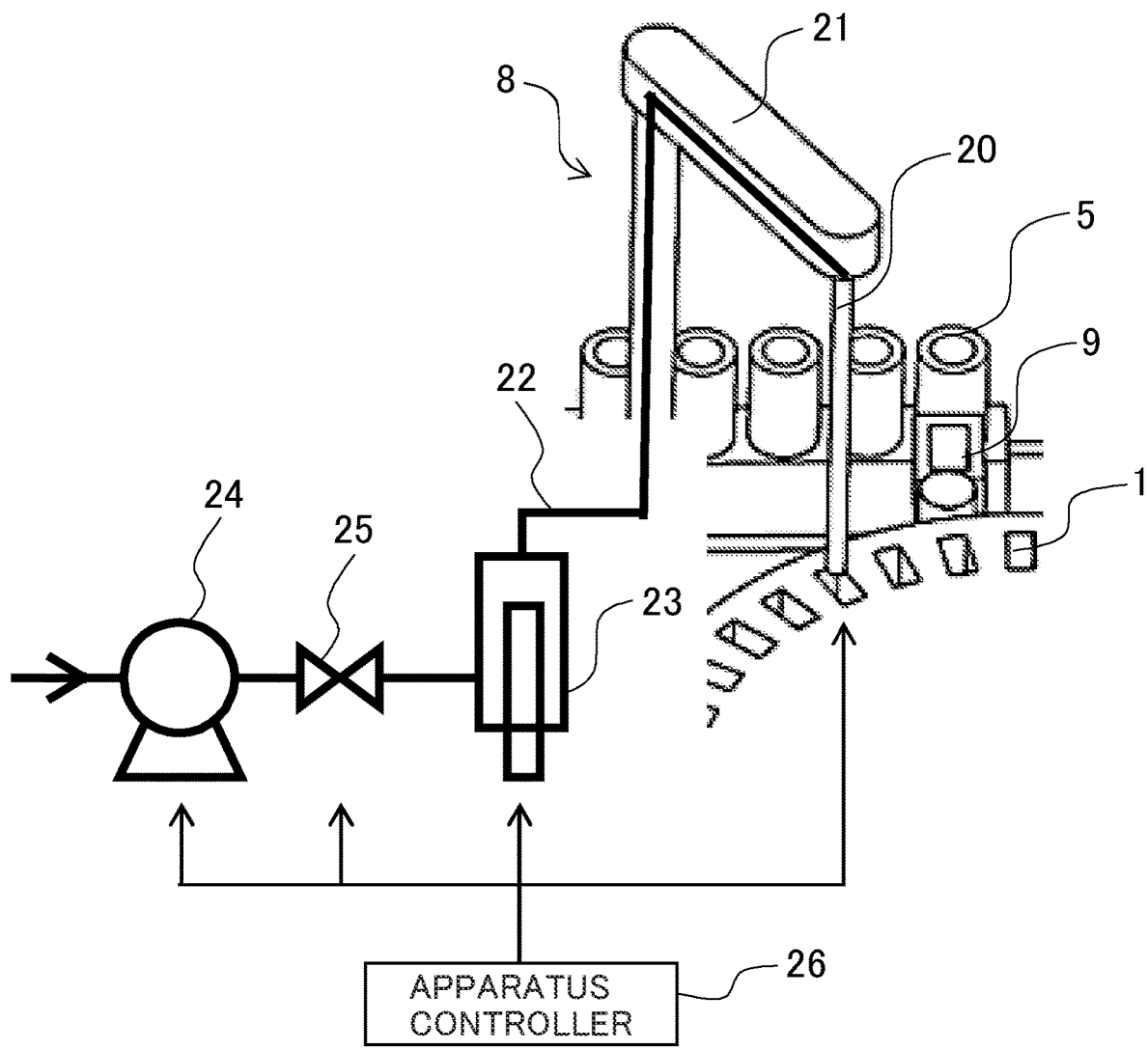
FIG. 2 is an example configuration of a sample dispensing system.

FIG. 2 is an example configuration of a sample dispensing system. The sample dispensing mechanism 8 includes: a sample probe 20 performing aspiration and ejection of a sample; and a sampling arm 21 supporting the sample probe 20. The sample probe 20 performs dispensations while reciprocating between the sample cups 5 and the reaction containers 1. The sample probe 20 is connected to a syringe pump 23 through piping 22, and the piping is internally filled with ion-exchange water. It is noted that the syringe pump 23 has the function of controlling a change in volume of fluid, and the ion-exchange water within the piping is driven to aspirate and eject a sample from the sample probe 20.

In this stage, if a sample is dispensed and subsequently another sample is aspirated, the interior cleaning is performed on the sample probe 20 in order to avoid contamination between the samples. On the other hand, if the same sample is continuously dispensed, the interior cleaning is not performed. A high-pressure pump 24 is connected to the piping 22. When the interior cleaning is performed on the sample probe 20, a solenoid valve 25 is opened so that the ion-exchange water is injected into the piping from the high-pressure pump 24. The injected ion-exchange water is used to clean the interior of the sample probe 20, which is then drained at a sample probe cleaning bath 9. Such operations are controlled by the apparatus controller 26 of the automatic analyzer.

In the automatic analyzer, typically, a plurality of items is often measured for a single sample subject to measurement. That is, the interior cleaning is not performed while the dispensing operation from a single sample is repeated the number of times equal to the number of requested items. Then, before the subsequent (different) sample is dispensed, the interior cleaning operation is performed. Because of this, the interior cleaning operation is performed on the sample probe once every multiple cycles.

Figure 3:
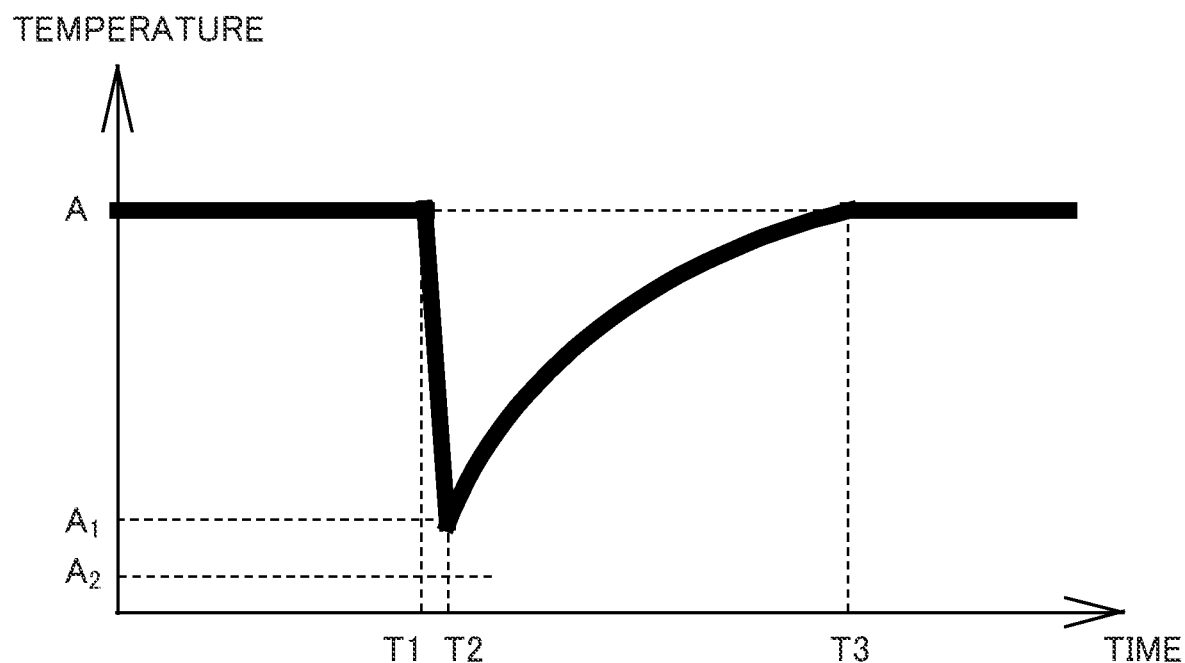
FIG. 3 is a graphical representation showing change in temperature of in-pipe fluid by interior cleaning operation.

FIG. 3 is a graphical representation of a change in temperature of in-pipe fluid of the sample dispensing system when the interior cleaning operation is performed. Assuming that the fluid temperature within piping prior to the interior cleaning operation (before time T1) is equal to an environmental temperature A around the piping. During the interior cleaning operation (from time T1 to time T2), ion-exchange water at a temperature $A_2$ is injected from the high-pressure pump 24 into the piping. Thereby, the fluid temperature within piping is reduced to a temperature $A_1$. After the completion of the interior cleaning operation (after time T2), the temperature of the in-pipe fluid rises gradually under the influence of heat from the surroundings of the piping, and then reaches, at time T3, the environmental temperature around the piping, again, which then becomes stable.

However, in actuality, no change in temperature as shown in FIG. 3 occurs because, in most cases, a long time period (from T2 to T3) is required until the temperature of the in-pipe fluid becomes equal to the environmental temperature around the piping and a time interval during which the interior cleaning operation is performed is shorter than the time period. Before the fluid temperature rises to the temperature of surrounding environment, if the subsequent interior cleaning operation is performed, the environmental temperature A around the piping is not reached.

Figure 4:
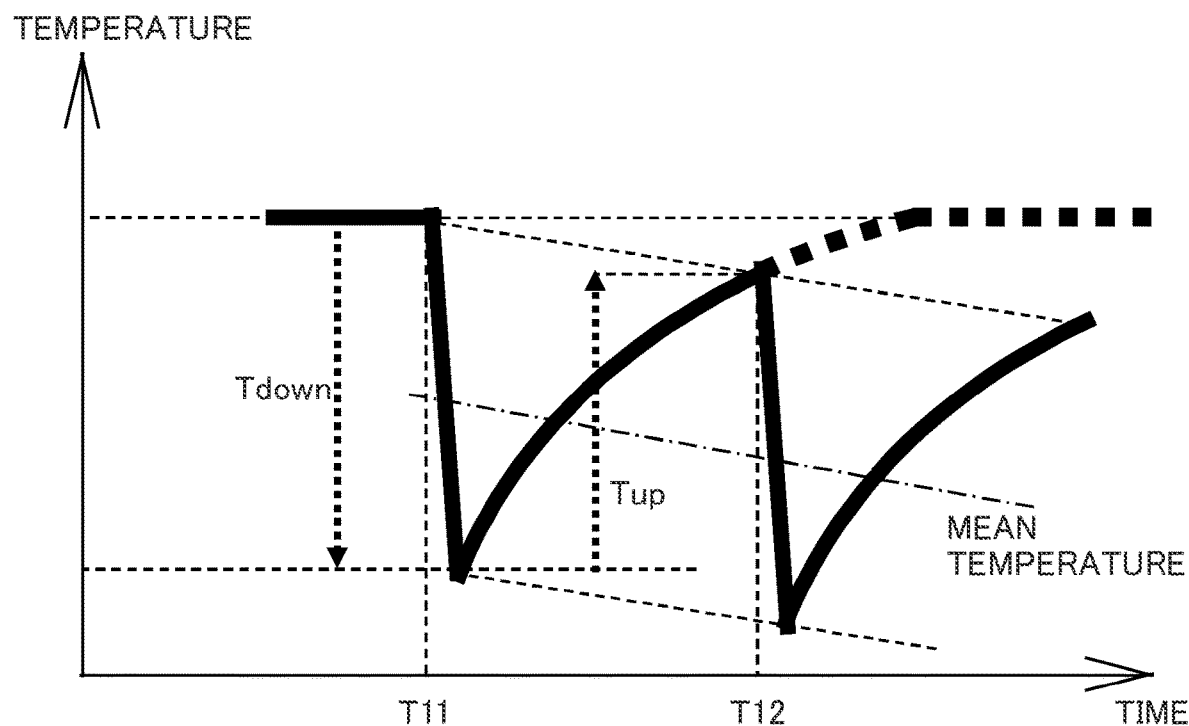
FIG. 4 is a graphical representation showing change in temperature of in-pipe fluid by interior cleaning operation.
Figure 5:
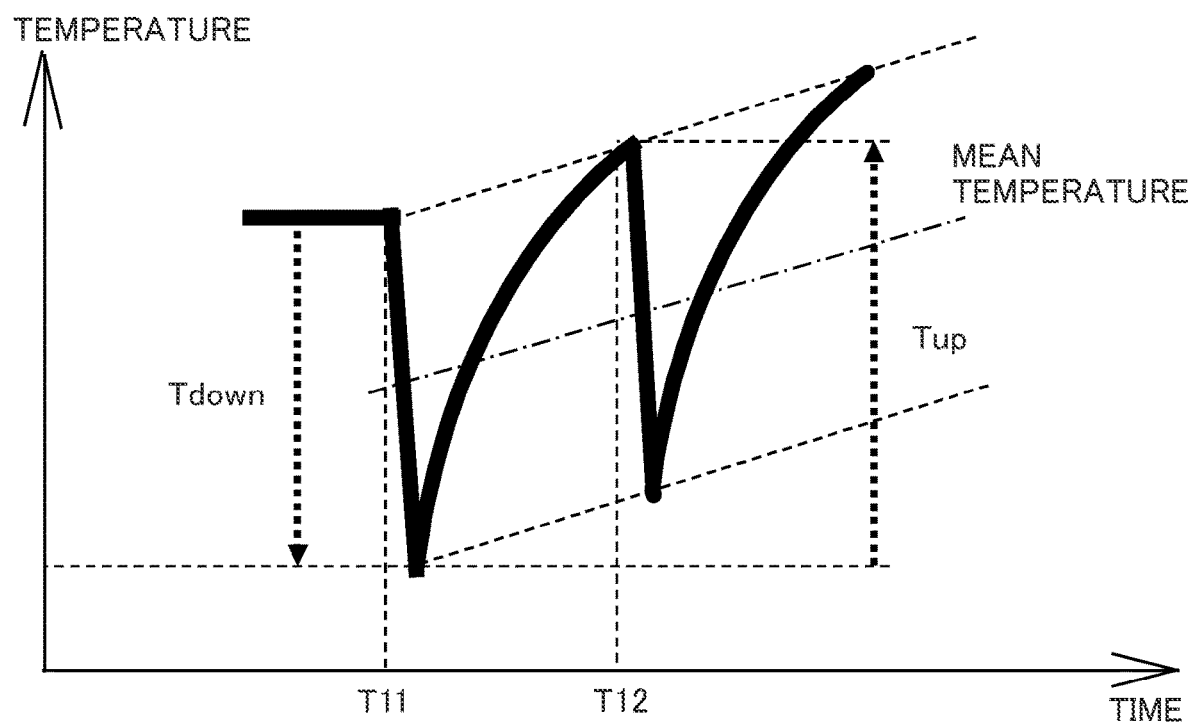
FIG. 5 is a graphical representation showing change in temperature of in-pipe fluid by interior cleaning operation.
Figure 6:
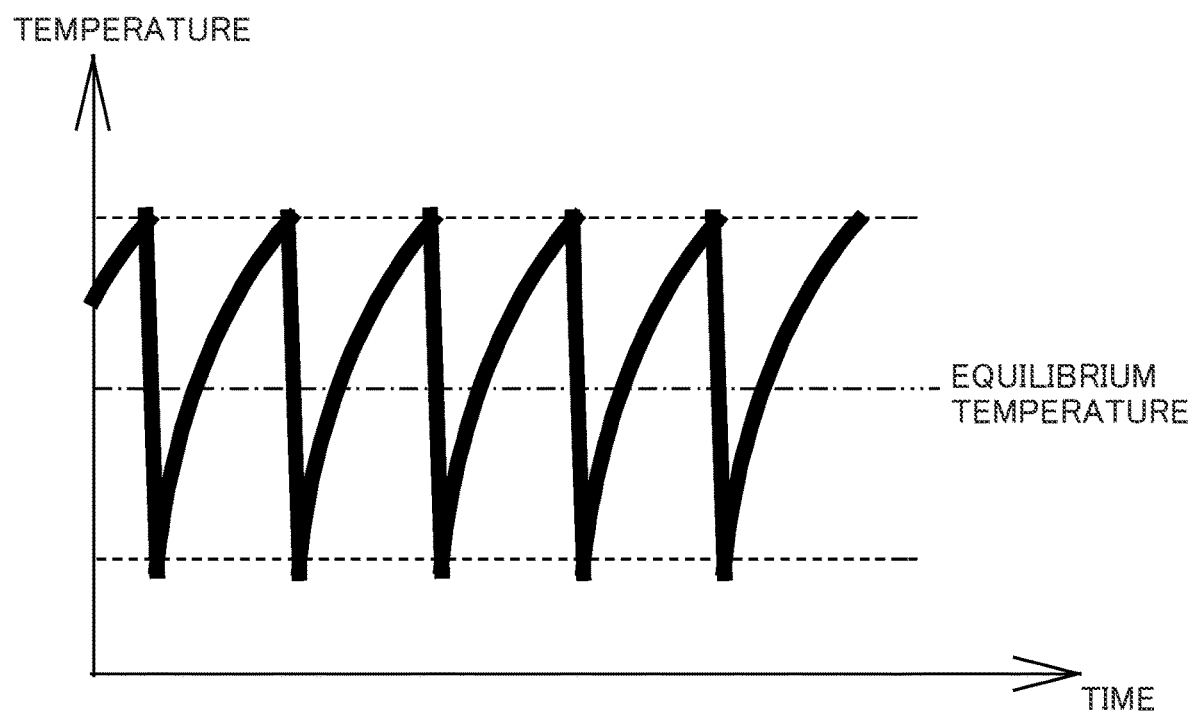
FIG. 6 is a graphical representation showing change in temperature of in-pipe fluid by interior cleaning operation.

For the temperature of the in-pipe fluid, assuming that $T_{down}$ is a decrease in temperature resulting from interior cleaning, and $T_{up}$ is an increase in temperature due to a lapse of time until interior cleaning following one interior cleaning is performed. The change in temperature of the in-pipe fluid shows different behaviors depending on the magnitude relationship between $T_{down}$ and $T_{up}$. In $T_{down}<T_{up}$ illustrated in FIG. 4, the mean temperature of the in-pipe fluid gradually decreases. On the other hand, in a state where, as illustrated in FIG. 5, the temperature within the piping is previously low and the temperature within the piping increases steeply even for a short while, or in a state where the interval until the subsequent interior cleaning is long because of a large number of measurement items, the relationship $T_{up}>T_{down}$ is established, so that the mean temperature of the in-pipe fluid gradually increases. Then, when $T_{up}=T_{down}$ as illustrated in FIG. 6 is reached, the mean temperature of the in-pipe fluid will have a constant value. This is defined herein as equilibrium temperature.

In the automatic analyzer, analyses are performed by repeating one-cycle operation as a base. A state of the sample dispensing system during analysis implementation is broadly divided into two, that is, a standby state before a sample subject to measurement is transported to the sample dispensing position, and an analysis state in which a sample located in the sample dispensing position is dispensed. A transition to the analysis state occurs after the standby state.

Figure 7:
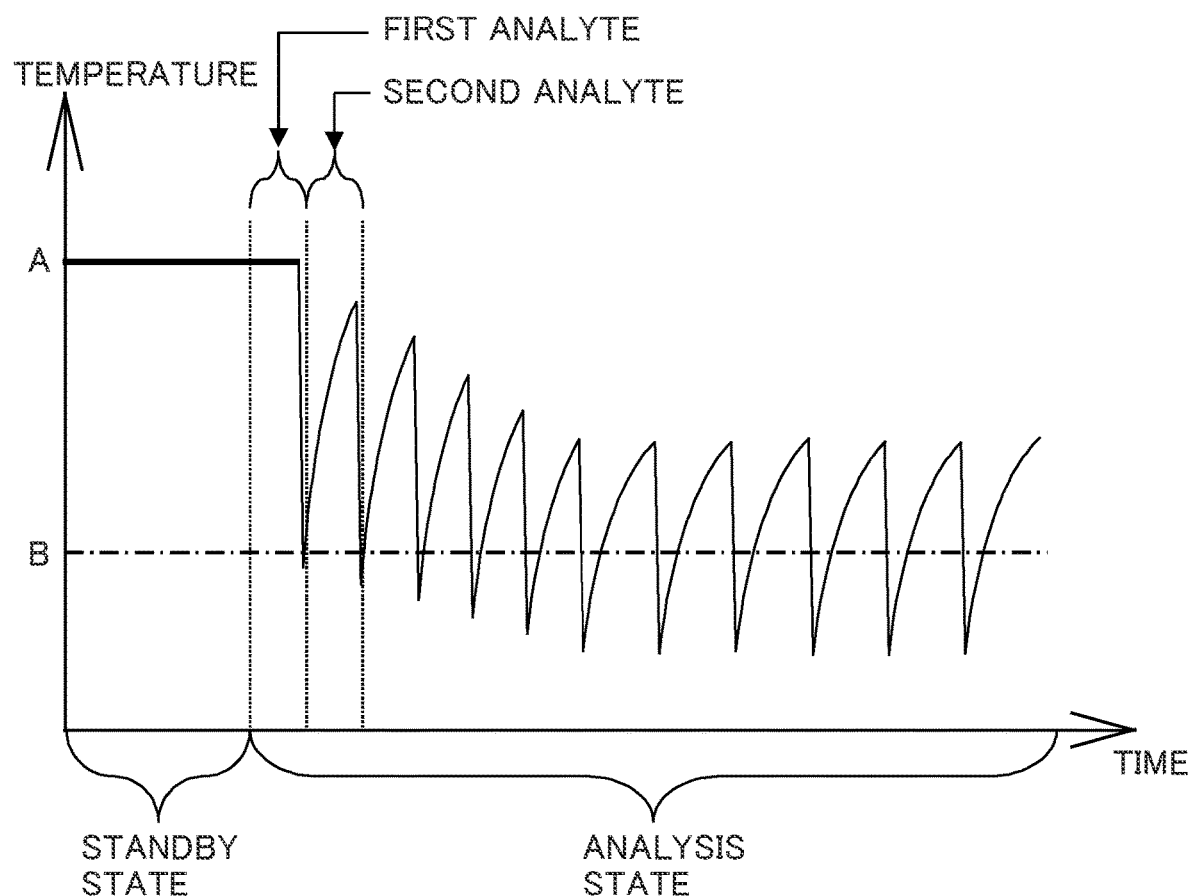
FIG. 7 is a graphical representation showing change in temperature of in-pipe fluid in a standby state when interior cleaning is not performed.

If the interior cleaning operation is not performed in the standby state, this means that the interior cleaning is not performed for a long time, and therefore such a state can occur that the temperature of the in-pipe fluid is equal to the temperature of surrounding environment as illustrated in FIG. 3. FIG. 7 illustrates (a graphical representation) a change in temperature of the in-pipe fluid in a transition from the standby state to the analysis state when the interior cleaning operation is not performed in the standby state. Since the temperature of the in-pipe fluid is equal to the temperature of surrounding environment in the standby state, no change in temperature occurs in the dispensing operation for a first analyte, and thus a favorable result is obtained. However, if the interior cleaning operation is performed for the purpose of avoiding carry-over, prior to dispensing execution for a second analyte, the ion-exchange water newly injected into the piping reacts with high temperatures of the surroundings, so that the temperature rapidly rises. Because of this, the amount of change in temperature during the dispensing operation for the second analyte is relatively larger than that during another dispensing operation. As a result, the analysis performance is degraded. Therefore, there is a need to minimum the influence of the change in temperature in a transition from the standby state to the analysis state, in such a manner that, even in the standby state, the interior cleaning operation is performed to bring the equilibrium temperature of the in-pipe fluid in the standby state as close to the equilibrium temperature in the analysis state as possible.

Incidentally, as described above, the automatic analyzer basically performs repeatedly one-cycle operation as a base, but typically, in the analysis state, measurements for multiple items are performed on a single sample. Because of this, the dispensing operation is performed on a single sample multiple times corresponding to the number of measurement items. Stated another way, the interior cleaning operation is performed only once every multiple cycles. Because of this, if, in the standby state, the same interior cleaning operation as done in the analysis state is performed for each cycle, a difference is made between the equilibrium temperature in the standby state and the equilibrium temperature in the analysis state, so that a change in temperature becomes remarkable in a first dispensing operation after a transition from the standby state to the analysis state. To address this, there is a need to minimize the difference in equilibrium temperature between the standby state and the analysis state. For that purpose, the apparatus controller causes the interior cleaning operation to be performed differently depending on an operation sequence to operate the sample dispensing system in the standby state and another operation sequence to operate the sample dispensing system in the analysis state.

Figure 8:
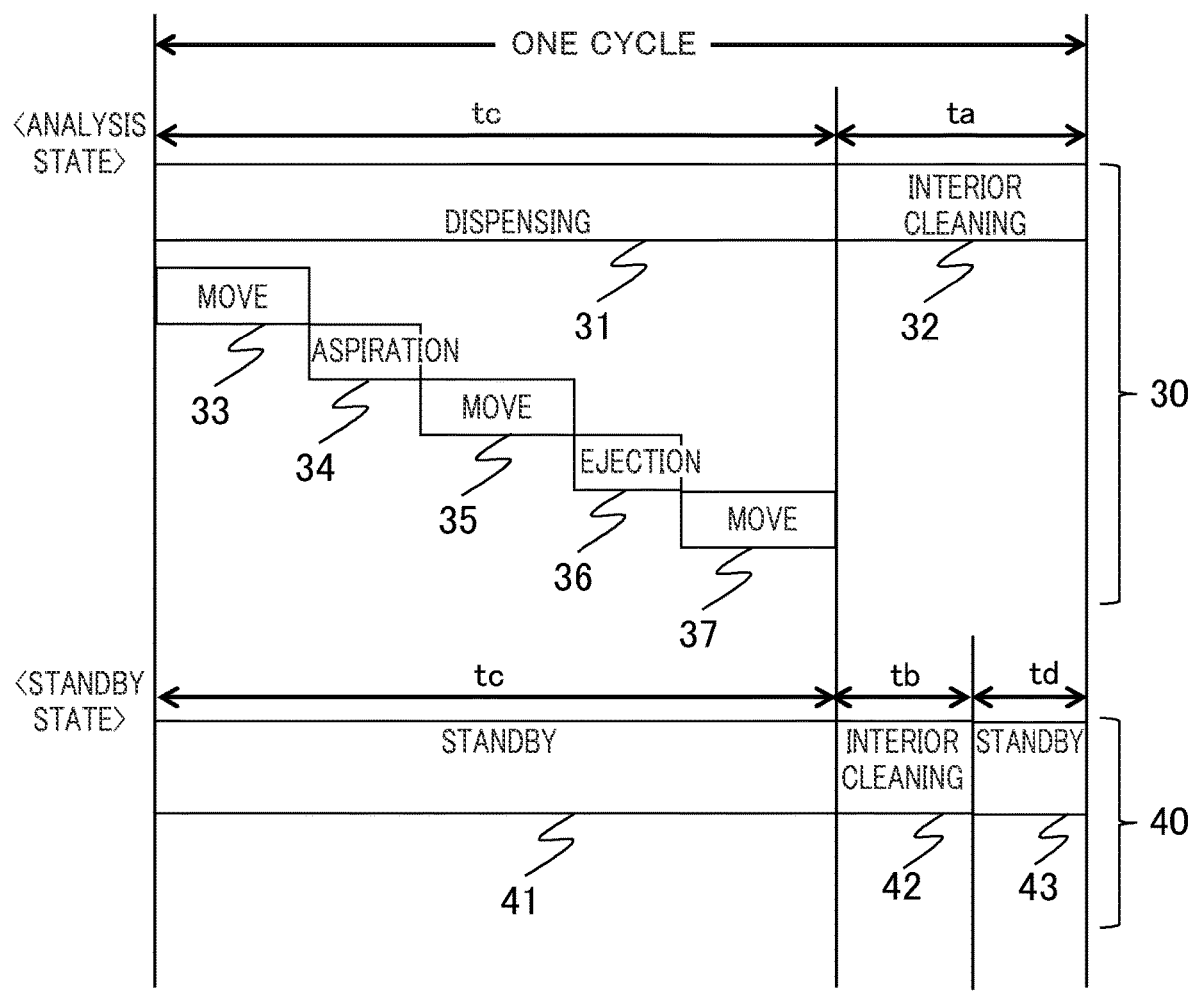
FIG. 8 is a diagram representing the operation in one cycle in each of the standby state and the analysis state.

FIG. 8 is a schematic diagram at one cycle in the operation sequence in each of the analysis state and the standby state according to the example. In the example, a time period of interior cleaning tb in an operation sequence 40 in the standby state is set to be shorter than a time period of interior cleaning ta in an operation sequence 30 in the analysis state (tb<ta). Time of one cycle in the operation sequence is the same both in the standby state and the analysis state. In the analysis state, a dispensing operation 31 and an interior cleaning operation 32 are performed during one cycle, whereas in the standby state, no dispensing operation is performed and only an interior cleaning operation 42 is performed. In standby operations 41, 43 except the interior cleaning operation 42, each mechanism in the sample dispensing system is at a standstill. Also, the dispensing operation 31 of the operation sequence 30 in the analysis state includes specifically: a move operation 33 to move the sampling arm 21 to an aspiration position; an aspiration operation 34 of the sample prove 20; a move operation 35 to move the sampling arm 21 to an ejection position; an ejection operation 36 of the sample probe 20; and a move operation 37 to move the sampling arm 21 to a cleaning position. In the example, a time period tc from the beginning of a cycle until the interior cleaning operation is performed is set to be equal in both the standby state and the analysis state.

Figure 9:
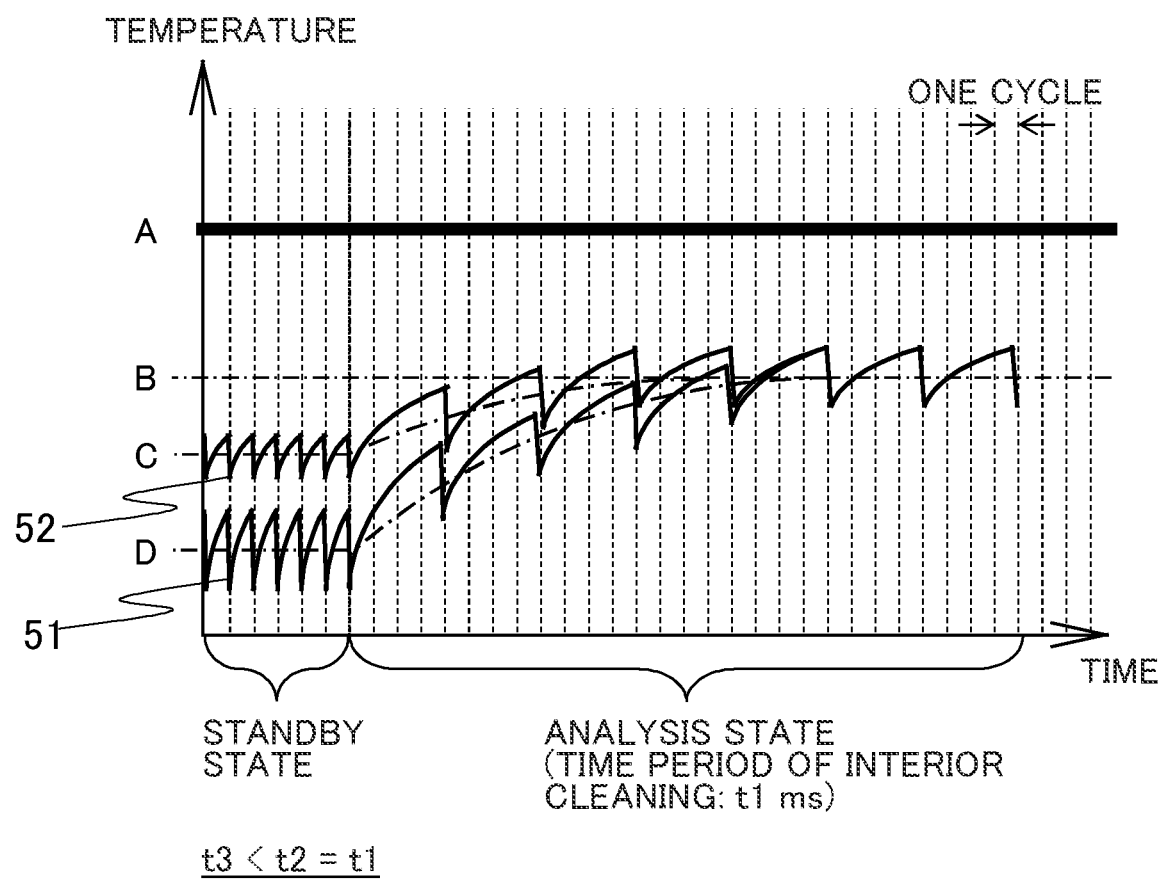
FIG. 9 is a graphical representation showing temperature change due to difference in time period of interior cleaning in the standby state.

FIG. 9 illustrates (a graphical representation) a change in temperature of the in-pipe fluid during analysis execution in the case where the time period of interior cleaning tb in the standby state differs. FIG. 9 illustrates a combination of a temperature change 51 and a temperature change 52, the temperature change 51 occurring in the case where the time period of interior cleaning tb (t2) in the standby state is equal to the time period of interior cleaning ta (t1) in the analysis state, the temperature change 52 occurring in the case where the time period of interior cleaning tb (t3) in the standby state is shorter than the time period of interior cleaning ta (t1) in the analysis state. Where the time period of interior cleaning tb (t2) in the standby state and the time period of interior cleaning ta (t1) in the analysis state are set equally to each other, since an equilibrium temperature difference (B-D) between both the states is large, a change in temperature becomes large during the dispensing operation in a first measurement after a transition to the analysis state. On the other hand, where the time period of interior cleaning tb (t3) in the standby state is set to be shorter than the time period of interior cleaning (t1) in the analysis state, an equilibrium temperature in the standby state rises as compared with that in the case of the time period of interior cleaning (t2), and therefore an equilibrium temperature difference (B-C) from the analysis state becomes small. Thereby, since a change in temperature can be further reduced during the dispensing operation in a first measurement after a transition to the analysis state, stabilization of measurement results is achieved. However, if the time period of interior cleaning tb is extremely short, the equilibrium temperature in the standby state is equal to the temperature A of surrounding environment as described above, and there is a possibility of occurrence of a state in which no interior cleaning operation is substantially performed. On this account, there is a need to set a time period of interior cleaning to fall within a range effective in making the equilibrium temperatures in the standby state and the analysis state closer to each other. Request details for analysis (the number of dispensing per sample, the frequency of interior cleaning in the analysis state) which determine an equilibrium temperature in the analysis state cannot be known in advance. Because of this, an optimum time period of interior cleaning cannot be uniquely determined, but as the time period of interior cleaning tb is shortened, the equilibrium temperature in the standby state logarithmically approaches gradually the temperature A of surrounding environment. Because of this, if the time period of interior cleaning tb in the standby state is set to 50% of the time period of interior cleaning to in the analysis state, the purpose of making the equilibrium temperature in the standby state close to the equilibrium temperature in the analysis state can be sufficiently achieved while avoiding a state in which substantial interior cleaning is not performed.

Stated another way, since what is required is that the mean temperature in the standby state approaches the equilibrium temperature in the analysis state, the effectiveness can be obtained by setting the time period of interior cleaning tb in the standby state to be shorter than the time period of interior cleaning ta in the analysis state to a certain extend. For example, the time period of interior cleaning tb may be set to 80% of the time period of interior cleaning ta. On the other hand, if the time period of interior cleaning tb in the standby state is 0% of the time period of interior cleaning ta in the analysis state, this is comparable to the fact that the interior cleaning is not performed. If the time period of interior cleaning tb in the standby state is set extremely short in this manner, the effectiveness will be lost. Therefore, the time period of interior cleaning tb in the standby state is desirably set to fall within a range from 20% or more to 80% or less of the time period of interior cleaning ta in the analysis state.

Also, the equilibrium temperature in the analysis state is not uniquely determined because it has a dependence on operation conditions of a facility in which the apparatus is used. Considering that the time period of interior cleaning is set such that proper effectiveness can be obtained in various operations conditions of facilities, the time period of interior cleaning tb in the standby state is desirably set at or about 50% of the time period of interior cleaning ta in the analysis state as described above. For example, the time period of interior cleaning tb in the standby state is set to fall within a range from 40% or more to 60% or less of the time period of interior cleaning ta in the analysis state.

Figure 10:
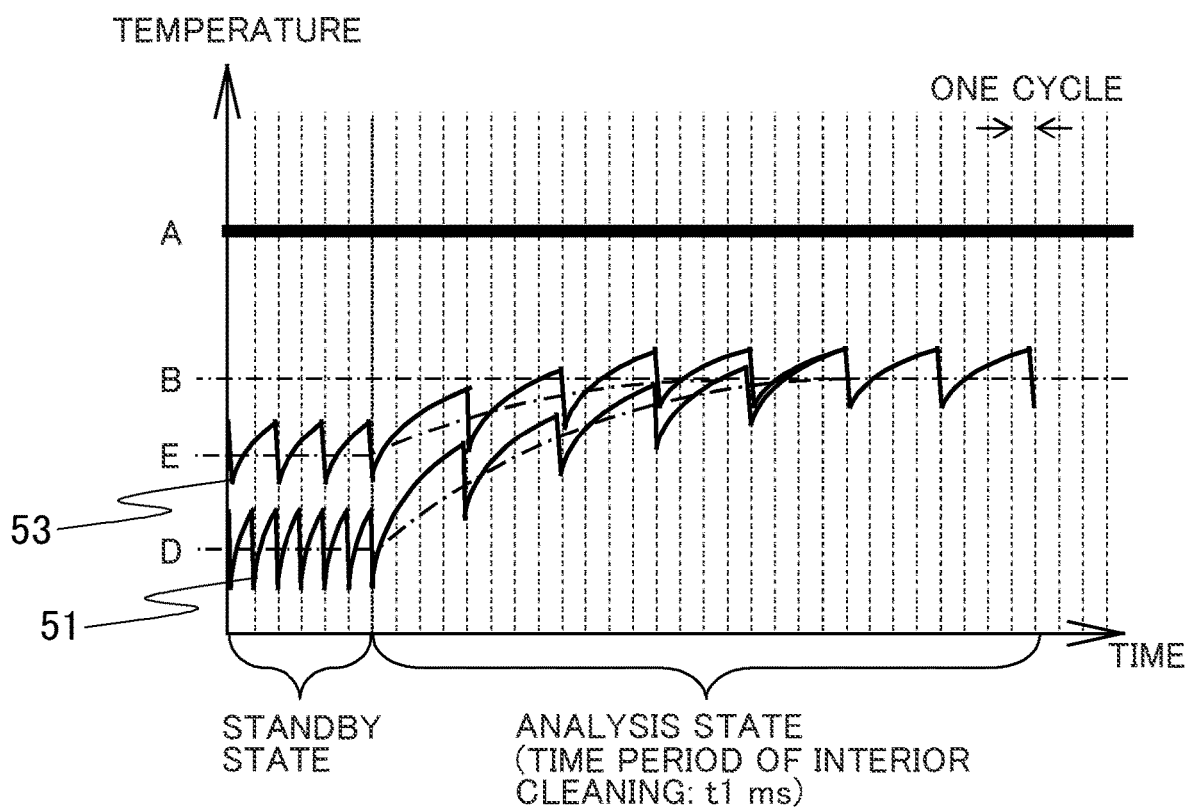
FIG. 10 is a graphical representation showing temperature changes due to difference in interior cleaning frequency in the standby state.

According to another embodiment, the frequency of interior cleaning in the standby state may be changed. FIG. 10 illustrates (a graphical representation) a change in temperature when the frequency of interior cleaning in the standby state differs. FIG. 10 illustrates a combination of a temperature change 51 and a temperature change 53 by way of example, the temperature change 51 occurring in the case where interior cleaning is performed once a cycle in the standby state, the temperature change 53 occurring in the case where interior cleaning is performed once every two cycles. It is noted that in the example, the time period of interior cleaning is the same (t1) both in the standby state and in the analysis state. As illustrated in FIG. 10, as the frequency of interior cleaning is reduced, the equilibrium temperature in the standby state increases. Because of this, as in the case of FIG. 9, again, the equilibrium temperature difference (B-E) between the standby state and the analysis state can be reduced. It is noted that FIG. 10 illustrates the case where the interior cleaning is performed once every two cycles, but the frequency of interior cleaning may be once every two or more cycles, such as once every three cycles, once every four cycles and the like. In this regard, similarly to the determination of the time period of interior cleaning, the determination of the frequency of interior cleaning is made for the purpose of causing equilibrium temperatures in the standby state and in the analysis state to approach each other. However, because request details for analysis (the number of dispensing per sample, i.e., the frequency of interior cleaning in the analysis state) cannot be known in advance, an optimum value cannot be uniquely determined. Therefore, similarly to the determination of the time period of interior cleaning, the frequency of interior cleaning should not be reduced to such an extent that a state occurs in which no interior cleaning is substantially performed.

As one approach for determining the time period of interior cleaning or the frequency of interior cleaning in the standby state, statistical processing can be performed on a result actually measured by the automatic analyzer, in order to find a mean equilibrium temperature of the in-pipe fluid in the analysis state, and thus to determine an optimum frequency of interior cleaning and an optimum time period of interior cleaning in the standby state. FIG. 11 illustrates (a graphical representation) a difference in equilibrium temperatures due to a difference in frequency of interior cleaning in the standby state. It is noted that, in the example, the same time period of interior cleaning is set both in the standby state and the analysis state. As illustrated in FIG. 11, the fewer the frequency of interior cleaning, the higher the equilibrium temperature becomes to approach the temperature of surrounding environment. Therefore, as illustrated in FIG. 11, equilibrium temperature data is previously registered in the apparatus for each frequency of interior cleaning in the standby state. A mean equilibrium temperature of the in-pipe fluid in the analysis state is estimated by performing the statistical processing on temperatures of the in-pipe fluid in the analysis state which have been actually measured by the automatic analyzer, and subsequently, a reference is made to a database containing a prepared and registered relationship between the frequency of interior cleaning and equilibrium temperatures in the standby state, and thus the frequency of interior cleaning in the standby state is determined to minimize the equilibrium temperature difference between the analysis state and the standby state. This enables a determination of an optimum frequency of interior cleaning in the standby state for the entire apparatus. It is noted that FIG. 11 shows the equilibrium temperatures when frequencies of interior cleaning differ, but similarly to FIG. 11, in the case of different time periods of interior cleaning, a relationship is established in which the shorter the time period of interior cleaning, the more the equilibrium temperature approaches the temperature of surrounding environment, and this makes it possible to pre-store a database in the apparatus, the database containing a registered relationship between time periods of interior cleaning and equilibrium temperatures in the standby state. Accordingly, the same approach may be applied. It is noted that, without limitation to setting any one of the time period of interior cleaning and the frequency of interior cleaning, both of them may be set to reduce the equilibrium temperature difference between the analysis state and the standby state. Then, by pre-storing a database containing registered relationship between equilibrium temperatures and combinations of time periods of interior cleaning and frequency of interior cleaning in the standby state, a determination with accuracy is enabled.

The operation sequence illustrated in FIG. 8 is an example in which the time period tc from the beginning of a cycle until the interior cleaning operation is performed is set to be equal in both the standby state and the analysis state. On the other hand, making the setting to advance the start timing of interior cleaning operation in one cycle in the standby state enables a reduction in the amount of change in temperature during the first dispensing operation after a transition from the standby state to the analysis state. FIG. 12 illustrates (a schematic representation) two operation sequences differing in timing of interior cleaning operations in one cycle in the standby state, and changes in temperature in the respective operation sequences. In Case A and Case B, the operation sequence in the analysis state is the same. However, in Case A, the interior cleaning operation in the standby state is set to be performed just after the beginning of a cycle, whereas, in Case B, it is set to be performed just before the end of a cycle. A change in temperature in Case A is a temperature change 60 shown by a solid line, and a change in temperature in case B is a temperature change 61 shown by a broken line. As illustrated in FIG. 12, the amount of temperature change $\alpha$ during the dispensing operation in Case A is smaller than the amount of temperature change $\beta$ during the dispensing operation in Case B. This is because the time until dispensing is performed is ensured by performing interior cleaning at the beginning of a cycle in the standby state, and in turn this makes it possible to avoid a steep temperature change region in the dispensing operation. In this manner, the interior cleaning start timing in a cycle in the standby state is set to be earlier than the interior cleaning start timing in a cycle in the analysis state, ultimately, the time from the beginning of a cycle in the standby state until the interior cleaning operation is performed is set as zero, thereby enabling a minimized amount of change in temperature during the subsequent dispensing operation. FIG. 12 illustrates the example in which the time period of interior cleaning in the standby state is set to be shorter than the time period of interior cleaning in the analysis state, but similar effectiveness can be obtained even in the case where the frequency of interior cleaning in the standby state is once every multiple times.

Further, as another embodiment, as illustrated in FIG. 13, the interior cleaning operation in the standby state may be set to be performed multiple times during one cycle (Case C). If the interior cleaning operation in the standby state is divided into multiple sections, the total time of the interior cleaning operation in one cycle (tb1+tb2+tb3) is set to be below the time period of interior cleaning to in the analysis state. FIG. 13 illustrates the example of (tb1+tb2+tb3)=tb (the time period of interior cleaning in Case A)<ta(the time period of interior cleaning in the analysis state). Since the time period of interior cleaning is the same in both Case A and Case C, it can be expected that the equilibrium temperature becomes H equally in both cases. However, $\gamma<\delta$ can be written, where $\delta$ is an amplitude of the temperature change 60 in Case A shown by the broken line and $\gamma$ is an amplitude of the temperature change 62 in Case B shown by the solid line. In this manner, by appropriately setting the total time of the interior cleaning operation in one cycle (tb1+tb2+tb3), the equilibrium temperatures in the standby state and the analysis state can be brought closer to each other, and also performing the divided sections of the interior cleaning operation in one cycle enables a reduction in amplitude of a change in temperature of the in-pipe fluid caused by the interior cleaning operation, resulting in ensuring of the stability of analysis results. The description in FIG. 13 is given of the example in which the total time of the time periods of interior cleaning in the standby state is set to be shorter than the time period of interior cleaning in the analysis state. However, similar effectiveness can be obtained even in the case where the frequency of interior cleaning in the standby state is once every multiple times. In this case, the total time of the time periods of interior cleaning in the standby state may be set to be equal to or shorter than the time period of interior cleaning in the analysis state.

LIST OF REFERENCE SIGNS

1 Reaction container
2 Reaction disk
3 Reagent bottle
4 Reagent cool box
5 Sample cup
6 Sample rack
7 Sample transport mechanism
8 Sample dispensing mechanism
9 Sample probe cleaning bath
10 First reagent dispensing mechanism
11 First reagent probe cleaning bath
12 Second reagent dispensing mechanism
13 Second reagent probe cleaning bath
14 Spectrophotometer
15 Reaction container cleaning mechanism
16, 17 Agitation mechanism
18, 19 Agitation mechanism cleaning bath
20 Sample probe
21 Sampling arm
22 Piping
23 Syringe pump
24 High-pressure pump
25 Solenoid valve
26 Apparatus controller
30 Operation sequence in analysis state
31 Dispensing operation
32 Interior cleaning operation
33, 35, 37 Move operation
34 Aspiration operation
36 Ejection operation
40 Operation sequence in standby state
41, 43 Standby operation
42 Interior cleaning operation
51, 52, 53, 60, 61, 62 Temperature change

The invention claimed is:

1. An automatic analyzer, comprising:
a sample dispensing system including a sample probe configured to dispense a sample located in a sample dispensing position;
an apparatus controller configured to control the sample dispensing system;
a pump coupled to the apparatus controller;
a solenoid valve coupled to the apparatus controller; and
a syringe coupled to the apparatus controller,
wherein the sample probe is connected to the syringe through piping which is filled with a liquid,
wherein the apparatus controller is configured to:
execute interior cleaning performed on the sample probe by opening the solenoid valve and injecting the liquid into the piping by controlling the pump,
execute a first operation sequence to operate the sample dispensing system in a standby state continued until the sample is transported to the sample dispensing position, and
execute a second operation sequence to operate the sample dispensing system in an analysis state in which the sample located in the sample dispensing position is dispensed, and
wherein a time period during interior cleaning performed on the sample probe in a single cycle of the first operation sequence is set to be shorter than a time period during interior cleaning performed on the sample probe in a single cycle of the second operation sequence.

2. The automatic analyzer according to claim 1, wherein the time period during interior cleaning performed on the sample probe in a single cycle of the first operation sequence is set to 20% or more and 80% or less of the time period during interior cleaning performed on the sample probe in a single cycle of the second operation sequence.

3. The automatic analyzer according to claim 1, wherein, in the first operation sequence, the interior cleaning of the sample probe is performed at a rate of once every multiple cycles.

4. The automatic analyzer according to claim 1, wherein the apparatus controller is configured to store a database, the database being registered with a relationship between an interior-cleaning time period which is the time period during the interior cleaning performed on the sample probe in a single cycle of the first operation sequence and an equilibrium temperature of in-pipe fluid of the sample dispensing system when the interior cleaning is performed on the sample probe for the interior-cleaning time period, and wherein the apparatus controller is configured to:

perform an actual measurement of a temperature of in-pipe fluid of the sample dispensing system in the analysis state to estimate an average equilibrium temperature of the in-pipe fluid in the analysis state, and reference the database to determine a time period to perform interior cleaning on the sample probe in a single cycle of the first operation sequence.

5. The automatic analyzer according to claim 1, wherein a time period of a single cycle of the first operation sequence is equal to a time period of a single cycle of the second operation sequence, and wherein a timing to start the interior cleaning of the sample probe in a single cycle of the first operation sequence is set to be earlier than a timing to start the interior cleaning of the sample probe in a single cycle of the second operation sequence.

6. The automatic analyzer according to claim 5, wherein the first operation sequence is such that the interior cleaning on the sample probe is performed immediately following a start of a single cycle.

7. The automatic analyzer according to claim 1, wherein the first operation sequence is such that the interior cleaning on the sample probe is performed multiple times in a single cycle, and wherein a total time of the time period during the interior cleaning performed on the sample probe multiple times in a single cycle of the first operation sequence is set to be shorter than the time period during the interior cleaning performed on the sample probe in a single cycle of the second operation sequence.

* * * * *